United States Patent [19]
Cooper, Jr.

[11] 3,727,305
[45] Apr. 17, 1973

[54] METHOD FOR MANUFACTURING A CONTROL ARTICLE
[75] Inventor: Irving B. Cooper, Jr., Atkinson, N.H.
[73] Assignee: Notifier Company, Lincoln, Nebr.
[22] Filed: Sept. 14, 1971
[21] Appl. No.: 180,435

Related U.S. Application Data

[60] Continuation of Ser. No. 859,602, July 7, 1969, abandoned, which is a division of Ser. No. 776,746, Nov. 18, 1968, Pat. No. 3,564,214, which is a continuation of Ser. No. 481,687, Aug. 23, 1965, Pat. No. 3,508,031.

[52] U.S. Cl. ...............29/625, 113/119, 174/68.5, 339/17 R
[51] Int. Cl. .......................B41m 3/08, H05k 3/00
[58] Field of Search.............235/61.12 C, 61.12 M; 340/173, 236, 149; 29/624–628; 339/17 R; 174/68.5; 113/119

[56] References Cited

UNITED STATES PATENTS 3,387,265  6/1968  Smeiman.................29/625 UX
2,774,060  12/1956  Thompson...............340/61.12 C

FOREIGN PATENTS OR APPLICATIONS 717,220  8/1965  Canada.............................340/173

Primary Examiner—Charles W. Lanham
Assistant Examiner—R. W. Church
Attorney—Willis M. Ertman

[57] ABSTRACT

A process of making a coded circuit card is disclosed wherein a foil sheet is selectively apertured and then overlayed with another such sheet and selective through apertures are formed in the composite. Then the composite is encased in opaque insulative material.

4 Claims, 19 Drawing Figures

PATENTED APR 17 1973 3,727,305

SHEET 2 OF 2
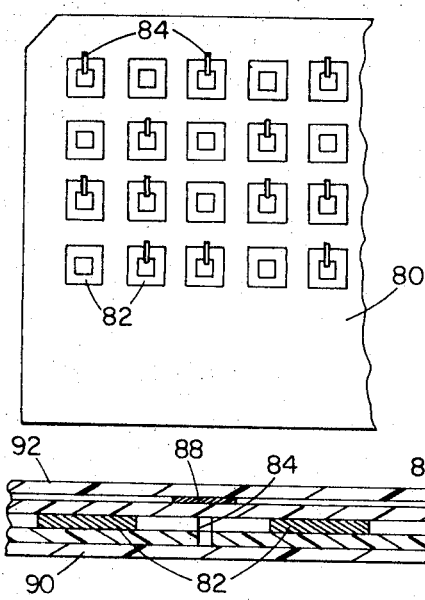
FIG 13
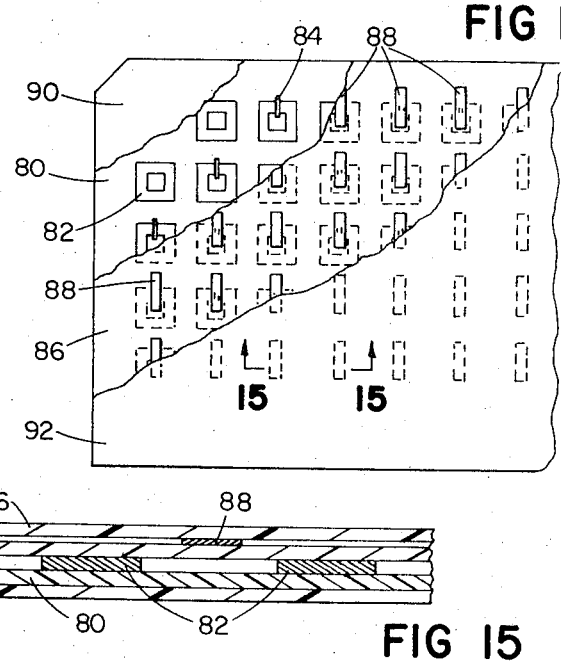
FIG 14
FIG 15
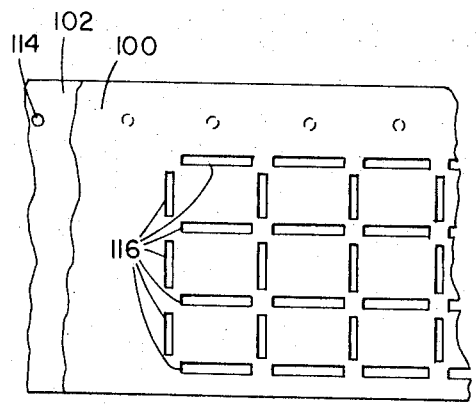
FIG 16
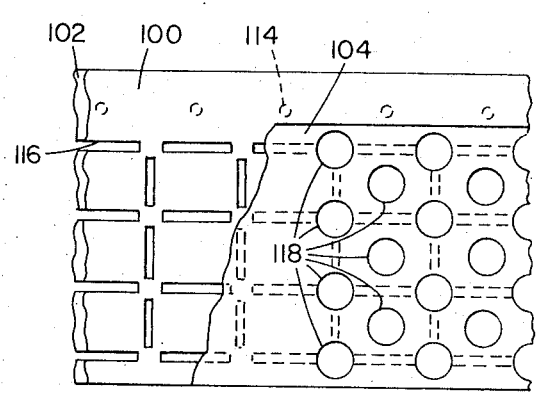
FIG 17
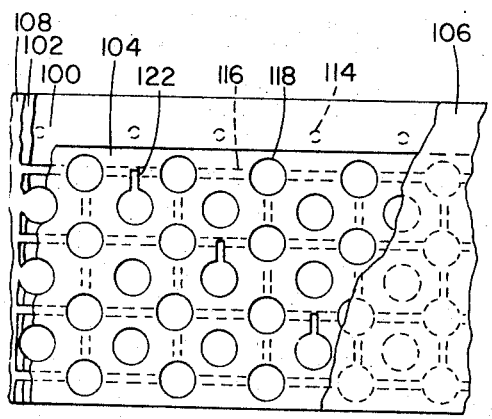
FIG 18
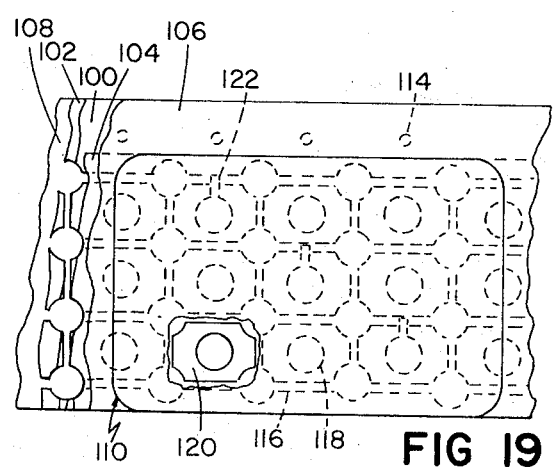
FIG 19

METHOD FOR MANUFACTURING A CONTROL ARTICLE

This application is a continuation of application Ser. No. 859,602, now abandoned, filed July 7, 1969, which application was a division of Ser. No. 776,746, filed Nov. 18, 1968, now U.S. Pat. No. 3,564,214 issued Feb. 16, 1971, which application was a continuation in part of Ser. No. 481,687 filed Aug. 23, 1965 now U.S. Pat. No. 3,508,031 issued Apr. 21, 1970.

SUMMARY OF INVENTION

This invention relates to control systems and more particularly to control articles, such as cards, on which information is recorded for use in such systems.

A variety of systems such as vending, accounting, and security control systems, frequently use a card or similar record as a control element. In such a system, a card bearing a particular arrangement of indicia is utilized with a sensing device to actuate a controlled apparatus or to record the use of an apparatus controlled by the sensing device and/or the identity of the possessor of the card. The sensing device employed in such systems typically should require little or no supervision and may be located in an unattended facility. In addition, the record should function reliably in a system that requires little or no maintenance, and the card or record should be difficult to counterfeit.

It is an object of this invention to provide a novel and improved article for use in a control system.

Another object of the invention is to provide a novel and improved coded article for use with a sensing system which operates reliably and with a high degree of security.

Still another object of the invention is to provide a novel and improved coded article having a high degree of security and being difficult to counterfeit for use in a control system.

A further object of the invention is to provide a novel and improved coded article for use in a control system which is capable for manufacture by mass production techniques.

Still another object of the invention is to provide novel and improved methods and apparatus for manufacturing coded articles for use in control systems.

In accordance with specific embodiments of the invention there is provided an article that carries a plurality of discrete electrically conductive elements. This article is designed for insertion in an article sensing structure which defines a sensing area in which are disposed a plurality of electromagnetic sensors, each electromagnetic sensor generating a flux field that extends across the article sensing area. The conductive elements are arranged on the article in a predetermined pattern corresponding to electromagnetic sensors in the sensing device. Each element functions as a shorted turn when disposed adjacent the flux field of a sensor in the sensing device for absorbing the flux and preventing the production of an output signal in response to that flux field. This article actuates reader systems that have high signal-no signal output ratios and that accurately transmit data substantial distances over simple transmission circuits. While the location of these code elements cannot be identified magnetically, other techniques such as X-raying might disclose the location of the operative conductive elements in the card. As a means of further increasing the security of the system, in accordance with the invention, some or all the conductive elements may be formed as loops of electrically conductive material and at least one of the loops is interrupted so that its effect on the magnetic field when the article is disposed in the sensing area is significantly reduced.

In a particular embodiment, further security is achieved by superimposing metal over the areas where the loops are modified to make detection of the loop interruptions more difficult. This metal in some embodiments is in the form of discrete elements and in other embodiments is a thin metal sheet. In a particular embodiment an adhesive backed lead sheet is employed in a laminated card.

In particular embodiments, the cards constructed in accordance with the invention are manufactured in a series of steps compatible with automated volume production equipment. Conductive loops are formed on a substrate in a predetermined pattern corresponding to the arrangement of sensors in the card reader, for example by deposition or etching by printed circuit techniques or in a punching operation. Individual loops are then interrupted in a selective operation to code the card with particular information. Suitable masking elements may be applied as in a laminating operation and the coded card is then encased in opaque material so that the relative positions of the conductive elements are not visible.

Coded articles for use in control systems constructed in accordance with the invention operate the control systems and associated output equipment reliably and accurately. The coded pattern of the cards is difficult to detect or to counterfeit.

Other objects, features and advantages of the invention will be seen as the following description of particular embodiments thereof progresses, in conjunction with the drawings, in which:

FIG. 13 is a top view of a substrate on which is disposed a plurality of loops of conductive material, some of which are interrupted;

FIG. 14 is a diagrammatic view, with portions broken away, of a card employing the substrate shown in FIG. 13;

FIG. 15 is a diagrammatic sectional view taken along the line 15—15 of FIG. 14;

FIG. 16 is a diagram of a substrate employed in manufacturing a form of card constructed in accordance with the invention;

FIG. 17 is a diagram indicating a first punching step of the substrate shown in FIG. 16;

FIG. 18 is a diagrammatic view indicating a second punching step of the substrate shown in FIG. 16; and FIG. 19 is a view indicating the card configuration provided from the processing steps shown in FIGS. 16–18.

DESCRIPTION OF PARTICULAR EMBODIMENTS

Figure 1:
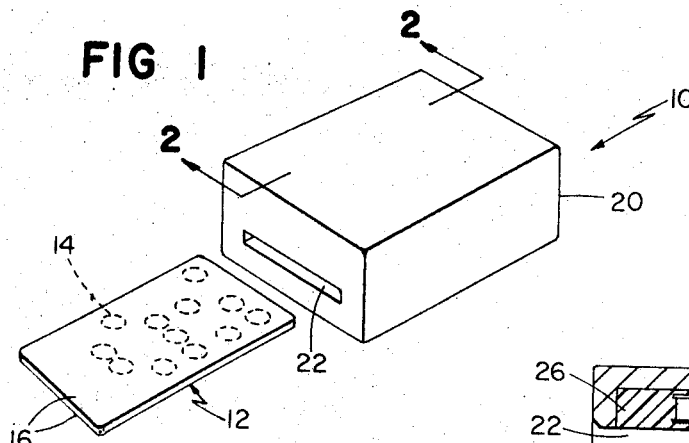
FIG. 1 is a perspective view of a card reader apparatus and a typical card configuration constructed in accordance with the invention.

With reference to FIG. 1, there is shown a card reader structure 10 for use with a card 12. The card 12 carries a plurality of electrically conductive indicia 14. Typically it is preferred that the indicia 14 be covered by opaque material 16 so that their relative positions in the card are not visible. In this embodiment they are copper discs in the order of 5 mils in thickness and are disposed at spaced locations.

Figure 2:
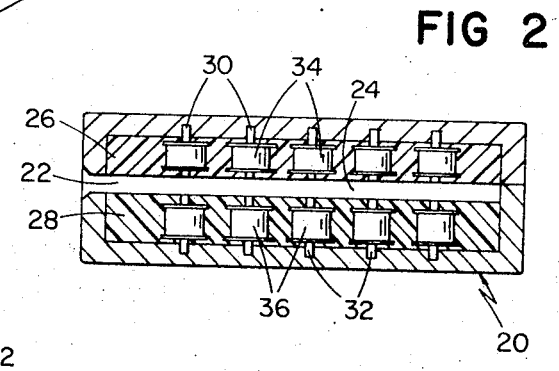
FIG. 2 is a sectional view taken along the line 2—2 of FIG. 1.

The card reader 10 includes a housing 20 having a slot 22 disposed on the front wall through which the card may be inserted for positioning in a card sensing area 24 disposed behind slot 22 as indicated in FIG. 2. This card sensing area is defined between upper and lower spaced surfaces behind which are disposed electromagnetic flux conductor members in the form of pole pieces 30. Mounted on the pole pieces 30 are primary windings 34 and on the lower pole pieces 32 secondary windings 36. Leads from the primary and secondary windings are brought out of the sensing area structure by suitable conductors (not shown) for connection to control circuitry of the type shown in my copending parent application Ser. No. 481,687. The primary winding of each sensor element generates a flux field when energized by a pulse in response to insertion of a card into area 24. That flux field induces an output signal in the associated secondary winding unless the flux is absorbed by a copper disc 14 interposed between the primary and secondary windings which disc functions as a "shorted turn". Thus, in this embodiment the discs 14 are located to inhibit only outputs of selected sensors.

Figure 3:
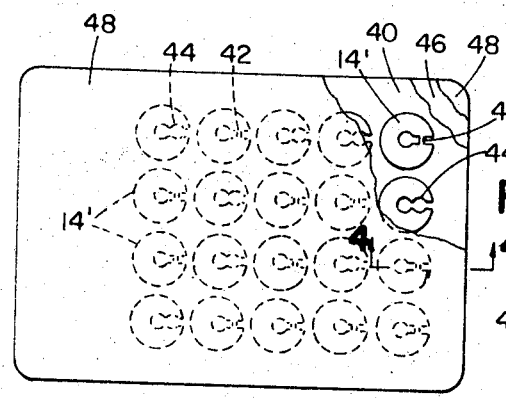
FIG. 3 is a top plan view of a second form of card constructed in accordance with the invention with a portion thereof broken away.
Figure 4:
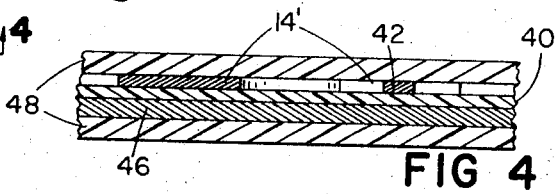
FIG. 4 is a sectional view taken along the line 4—4 of FIG. 3.
Figure 5:
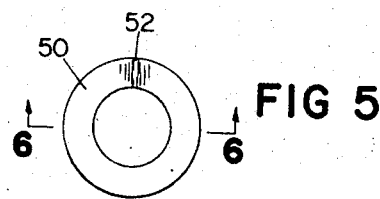
FIGS. 5, 7, 9 and 11 are top views of conductor loop configurations which may be employed in the card shown in FIG. 3.

Another configuration of card 12 is shown in FIG. 3. In each sensor position is disposed a conductive element 14'. In the particular embodiment shown in FIG. 3, each element 14' is an etched annulus of copper (0.0025 inch thick and 0.375 inch O.D. with a 0.125 inch hole) that forms a conductive loop. A glass epoxy substrate 40 supports loops 14'. Each loop has a section 42 of reduced width and one or more conductive loops 14' are deactivated by punching a hole 44 through the loop to interrupt the electric current flow path. These conductors may take a variety of forms. For example, they may be simple annuli as indicated in FIGS. 3 and 5–12 or of modified square shape as indicated in FIGS. 13–19. A 0.005 inch thick lead sheet 46 is adhesively laminated to substrate 40. The laminated structure is then secured between opaque upper and lower members 48 so that neither the positions of conductive elements 14 nor which have been interrupted is apparent to the user of the card.

Figure 7:
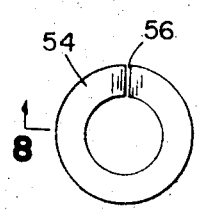
Figure 8:

With reference to the indicia configuration shown in FIGS. 5–12, annealed electrical grade copper annuli, 0.005 inch thick are employed. The disc 50 shown in FIG. 5 has a groove 52 swaged in it to reduce its thickness at the base of groove 52 to 0.002 inch. Where the indicium is not to influence the electric field significantly a disc 54 as indicated in FIGS. 7 and 8 is employed which has a slot 56 cut all the way through it so that the electrical path is completely interrupted.

Figure 9:
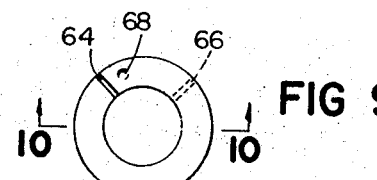
Figure 6:
FIGS. 6, 8, 10 and 12 are sectional views of the conductor loop elements shown in FIGS. 5, 7, 9 and 11, respectively.
Figure 10:
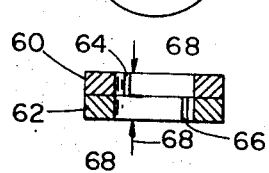
Figure 11:
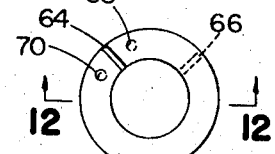
Figure 12:
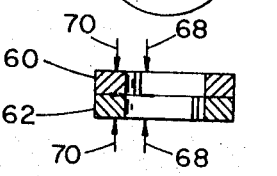

A second form of indicium is indicated in FIGS. 9–12. In this form two copper discs 60, 62 are stacked on top of one another. Each disc has a slot 64, 66 respectively in it. The two slotted discs are electrically connected together in stack form as soldering, braizing or welding as indicated in FIGS. 10 and 12. Where a shorted turn effect is not desired, only one connection 68 is employed as indicated in FIGS. 9 and 10. While where the shorted turn effect is desired, two connections 68, 70 are employed as indicated in FIGS. 11 and 12. Thus the only difference between a disc structure which significantly modifies the flux path and one which does not is a second electrical connection. This configuration is particularly useful in high security areas where it is desirable to minimize the ability to discern the coding arrangement in the card by X-ray techniques or other means.

In operation, a card 12 is inserted into the card reader 10. If an uninterrupted conductor 14 is positioned between the primary windings 34 and secondary windings 36 the flux is sufficiently abosrbed to reduce the magnitude of the output signal from the secondary winding, effectively preventing the production of an output signal. The interrupted loops do not have such effect however and those secondary windings produce output signals.

The embodiment shown in FIGS. 13–15 is suitable for automated production. With reference to FIG. 13 there is provided a substrate 80 on which a pattern of rectangular electrically conductive loops 82 has been located by printed circuit techniques. The card substrate 80 is then punched as for example by a conventional digital card punch to provide apertures 84 at selected locations as indicated in FIG. 13. Thus the coding of the top line is 01010. A second laminate sheet 86 has a corresponding pattern of rectangular conductive bars 88 disposed thereon. Elements 88 are disposed to overly and enclose the area of each corresponding loop 82 that may be punched. The two laminate sheets, substrate 80 being punched, and substrate 86 not being punched are assembled together between opaque sheets 90, 92 as indicated in FIGS. 14 and 15 and then sheared into suitable card configuration.

Still another process for manufacturing a card configuration is shown in FIGS. 16–19. In this process a conductive strip 100 with a pattern of holes 116 as indicated in FIG. 16 has a support sheet 102 laminated to it. A second support sheet 104 is laminated to sheets 100, 102 and additional holes 118 are punched in the laminated structure as indicated in FIG. 17 to form conductive loops 120. A selective punching operation is then performed as indicated in FIG. 18 to form rectangular holes 122 which interrupt the corresponding loops 120; and then opaque top and bottom sheets 106, 108 are bonded to the punched strip and individual cards 110 are cut out. In one form the strip 100 is a laminate consisting of conductive foil 100 and a backing 102 which provides handling reinforcement. Registration holes 114 are spaced along one edge of the sheet 102. The strip 100 is indexed past a set of seven punches which punch the set of seven holes 116 at each step to form the pattern as indicated in FIG. 16. After the punching operation indicated in FIG. 16 has been completed, a second support sheet 104 is added and a second set of seven punches actuated to punch at each indexing operation of the strip the holes 118 as indicated in FIG. 17. It will be seen that the metal remaining in each indicium at this stage is in the form of a disc or loop 120, each disc being isolated from the adjacent discs by the punching operations performed in FIGS. 16 and 17. The laminate strip is then moved to a selective punch station. (Such a station may employ for example a conventional IBM card punch. In another card configuration, the formed conductive discs 120 might be aligned in four rows and 16 elements in a row. Thus of the conventional IBM card arrangement of a 12X80 matrix, only 64 punches would be available for use.) Those punches are selectively actuated to slot certain of the discs. In the embodiment illustrated in FIGS. 18 and 19, the first disc in the top row, the middle disc in the second row and the third disc in the bottom row are punched in this stage. After this selective punching operation has been completed two opaque cover sheets 106, 108 are laminated on the punched strip so that the information on the card is completely sealed. In this embodiment the foil 100 is 0.001 inch thick and the completed card, laminated utilizing commercially available equipment, has a thickness of 0.030 inch and contains nine indicia 120. In other embodiments aluminum foil of 0.0005 inch thickness has been satisfactorily used as the "shorted turn" material. Identification code, or instruction information may be printed or embossed on certain cards constructed in accordance with broad aspects of the invention.

It will be obvious to those skilled in the art that other record and indicia configurations and other manufacturing techniques may be employed in accordance with the invention. Therefore while particular embodiments of the invention have been shown and described, it is not intended that the invention be limited to the disclosed embodiments or to details thereof, and departures may be made therefrom within the spirit and scope of the invention as defined in the claims.

What is claimed is:

1. A method for manufacturing a card having digital data encoded thereon for reading with electronic data processing equipment which includes an array of sensors, each sensor including a flux generating element and a flux responsive element comprising the steps of forming a first series of apertures spaced from one another in an electrically conductive strip, laminating a support sheet to said apertured electrically conductive strip, forming a second series of apertures spaced from one another in the laminated conductive strip-support sheet assembly, apertures of said second series being connected to apertures of said first series to form discrete portions of said electrically conductive strip spaced from one another, said discrete portions defining an array of electrically conductive loops disposed in a pattern on said support sheet in position corresponding to said sensor array in said processing equipment, interrupting certain of said conductive loops; and encasing said conductive strip-support sheet assembly in opaque material to provide an article for insertion into the card sensing area of said electronic data processing equipment.

2. The method as claimed in claim 1 and further including the step of laminating a second support sheet carrying a plurality of spaced electrically conductive members to said conductive strip-support sheet assembly to position an electrically conductive member over each interruption in said loops.

3. The method as claimed in claim 1 and further including the step of positioning an X-ray absorbing member over each interruption in said loops.

4. The method as claimed in claim 1 wherein said first and second series of apertures and the interruptions in said conductive loops are formed by punching.

* * * * *